US007059753B2

(12) United States Patent
Krüger et al.

(10) Patent No.: US 7,059,753 B2
(45) Date of Patent: Jun. 13, 2006

(54) LAMP WITH PLASTIC BASE HAVING A RADIATION PROTECTIVE COATING

(75) Inventors: Ursus Krüger, Berlin (DE); Uwe Pyritz, Berlin (DE); Thomas Schmidt-Lehmann, Kleinmachnow (DE); Raymond Ullrich, Schönwalde (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 166 days.

(21) Appl. No.: 10/798,870

(22) Filed: Mar. 12, 2004

(65) Prior Publication Data

US 2004/0183445 A1 Sep. 23, 2004

(30) Foreign Application Priority Data

Mar. 21, 2003 (DE) ................................ 103 12 806

(51) Int. Cl.
*B60Q 1/02* (2006.01)
*B60Q 1/00* (2006.01)

(52) U.S. Cl. .................... 362/538; 362/459; 313/318.1

(58) Field of Classification Search ................ 362/538
See application file for complete search history.

(56) References Cited

U.S. PATENT DOCUMENTS

| | | | | |
|---|---|---|---|---|
| 4,017,661 | A * | 4/1977 | Gillery | 428/412 |
| 5,428,261 | A * | 6/1995 | Wittig et al. | 313/318.1 |
| 6,887,354 | B1 * | 5/2005 | Karras et al. | 204/192.18 |
| 2004/0032210 | A1 | 2/2004 | Karras et al. | 204/192.18 |

FOREIGN PATENT DOCUMENTS

| | | |
|---|---|---|
| EP | 0 580 013 | 1/1994 |

* cited by examiner

*Primary Examiner*—Renee Luebke
*Assistant Examiner*—Leah Lovell
(74) *Attorney, Agent, or Firm*—William E. Meyer

(57) ABSTRACT

The invention relates to a lamp, in particular a motor-vehicle headlight lamp, with a plastic part of which the surface is provided with a coating which contains at least one compound of a metal with oxygen or nitrogen. The coating has the effect of preventing gas emission from the plastic.

2 Claims, 3 Drawing Sheets

LAMP WITH PLASTIC BASE HAVING A RADIATION PROTECTIVE COATING

I. TECHNICAL FIELD

Figure 1:
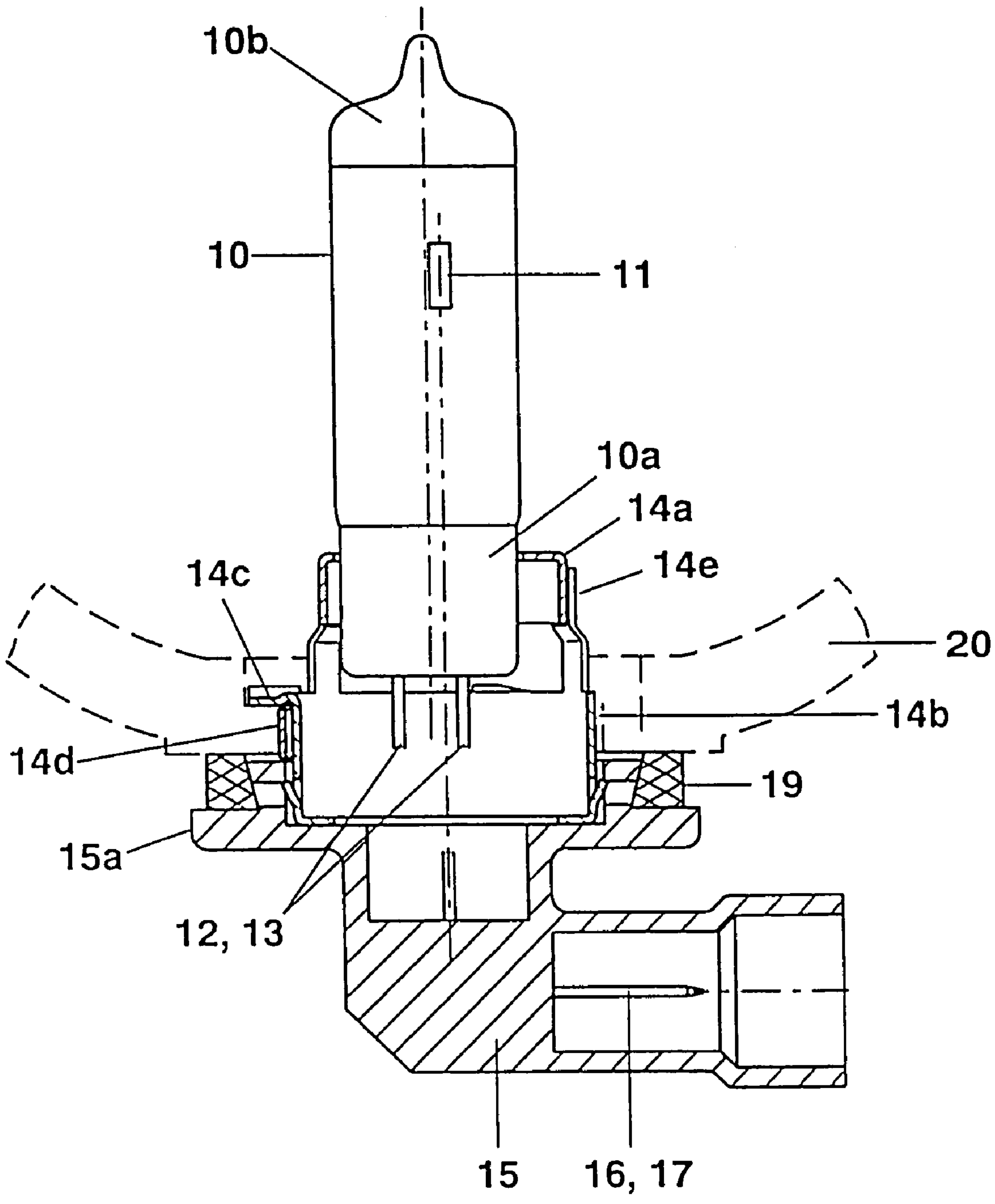

The invention relates to a lamp with at least one luminous means and a plastic part, the surface of which is at least partially provided with a covering.

II. BACKGROUND ART

Such a lamp is described for example in European patent application EP 0 580 013. This patent application discloses a high-pressure discharge lamp for a motor vehicle headlight with a plastic base and two lamp vessels fixed in the plastic base. One of these lamp vessels is formed as a discharge vessel, in which an ionizable filling is arranged for generating a light-emitting gas discharge, while the other lamp vessel is formed as an outer bulb, which encloses the discharge vessel. The surface of the plastic base facing the lamp vessels is covered by a ceramic plate, in order to shield the base from the ultraviolet radiation generated by the gas discharge.

III. DISCLOSURE OF THE INVENTION

It is the object of the invention to provide a lamp of the generic type with improved shielding of the base from the radiation generated by the luminous means.

This object is achieved by a lamp with at least one luminous means and a plastic part, the surface of which is at least partially provided with a covering, wherein said covering is formed as a coating which contains at least one compound of a metal with oxygen and/or nitrogen.

The lamp according to the invention has at least one luminous means and a plastic part, the surface of which is at least partially provided with a covering, this covering being formed as a coating which contains at least one compound of a metal with oxygen and/or nitrogen, in order to protect the plastic part from the radiation generated by the at least one luminous means. The aforementioned metal-oxygen or metal-nitrogen compounds are understood as meaning not only the oxides or nitrides of the metals but also their compounds with oxygen or nitrogen that do not correspond to the stoichiometric ratio of the elements involved, and also their oxynitrides.

The coating according to the invention, which preferably extends at least over the surface of the plastic part facing the at least one luminous means, can be produced at much lower cost and much more simply than the ceramic plate disclosed in the prior art. It has been found that a coating of the plastic surface that is thin in comparison with the ceramic plate and comprises a compound of a metal, preferably a metal from the group iron, copper, zirconium and aluminum, with oxygen or nitrogen already ensures very good protection of the plastic part from the radiation emitted by the luminous means. Comparatively thin coatings, with for example a thickness of only 1 μm, which contain the aforementioned compounds are already sufficiently impermeable to ultraviolet radiation and to light from the visible spectral range, so that gas emissions from the plastic and radiation damage to the plastic of the base part are prevented. It has been found that a coating according to the invention, applied by means of a vacuum coating technique, has very good adhesion on the surface of the plastic part and good scratch resistance. This also applies in particular to non-planar surfaces and to coatings on plastic parts which consist of a plastic that provides electrical insulation and can be subjected to high temperatures, such as for example polyphenylene sulfide, polyether imides, polyphthalamides, liquid-crystal polymers, polyether ketone and polyetherether ketone. The coating according to the invention is also impermeable to any gas emissions from the plastic part. The coating may in this case act as a getter or as a barrier for any gas emissions.

The coating according to the invention may comprise a number of layers. A coating which has a least three layers is advantageous, two of the layers comprising a compound of a metal with oxygen and/or nitrogen and the third layer being formed by a metallic intermediate layer between the two aforementioned layers. The metallic intermediate layer can be produced more easily and quickly than the two other layers. On the other hand, the aforementioned coating made up of at least three layers has equally good properties with regard to adhesion, scratch resistance and impermeability to short-wave electromagnetic radiation as a coating which exclusively comprises the compound of a metal with oxygen and/or nitrogen. The invention can be applied particularly advantageously to lamps for vehicle headlights, since clouding of the headlights by gas-emitting plastic parts is prevented by the application of the invention.

IV. BRIEF DESCRIPTION OF THE DRAWINGS

Figure 2:
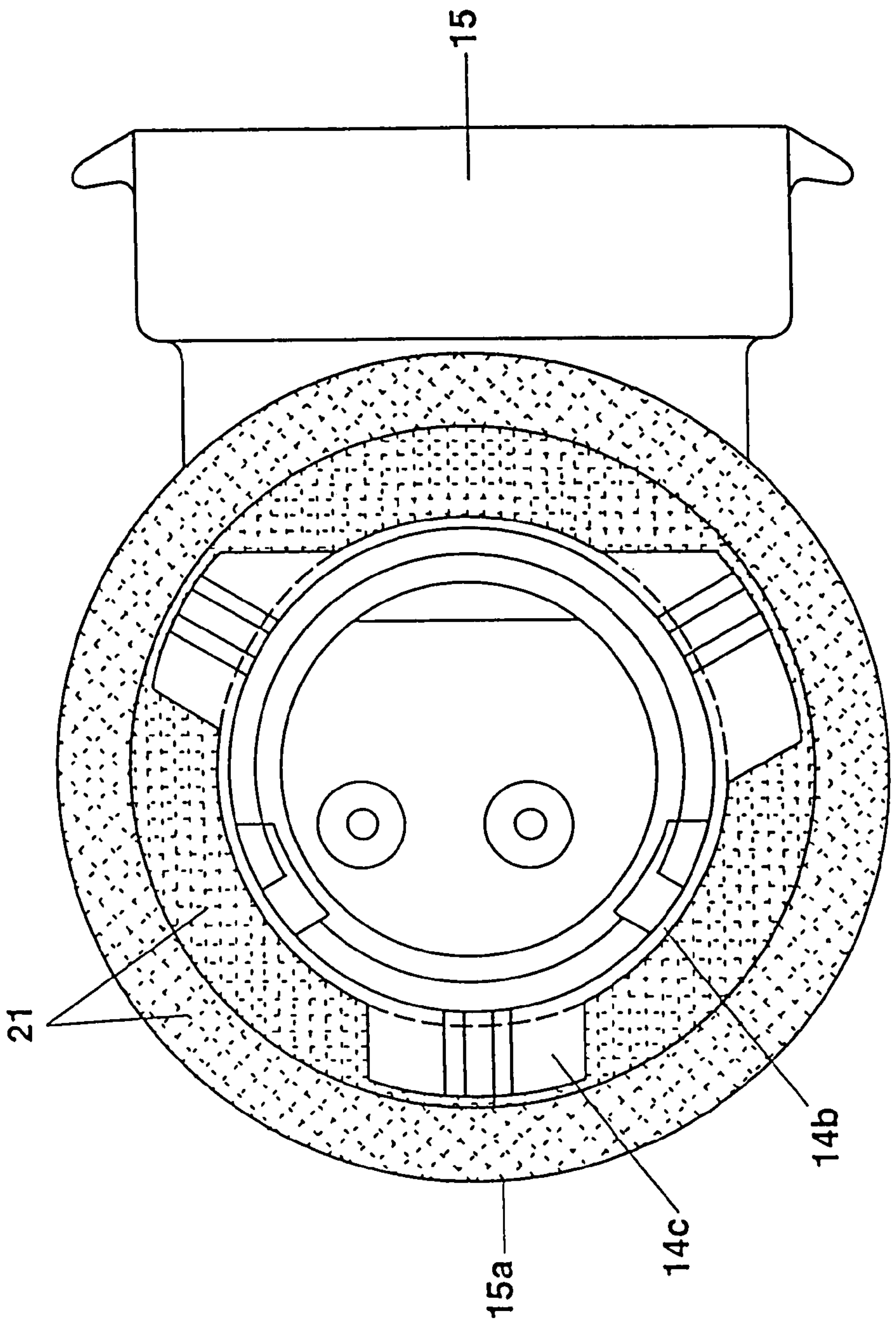
Figure 3:
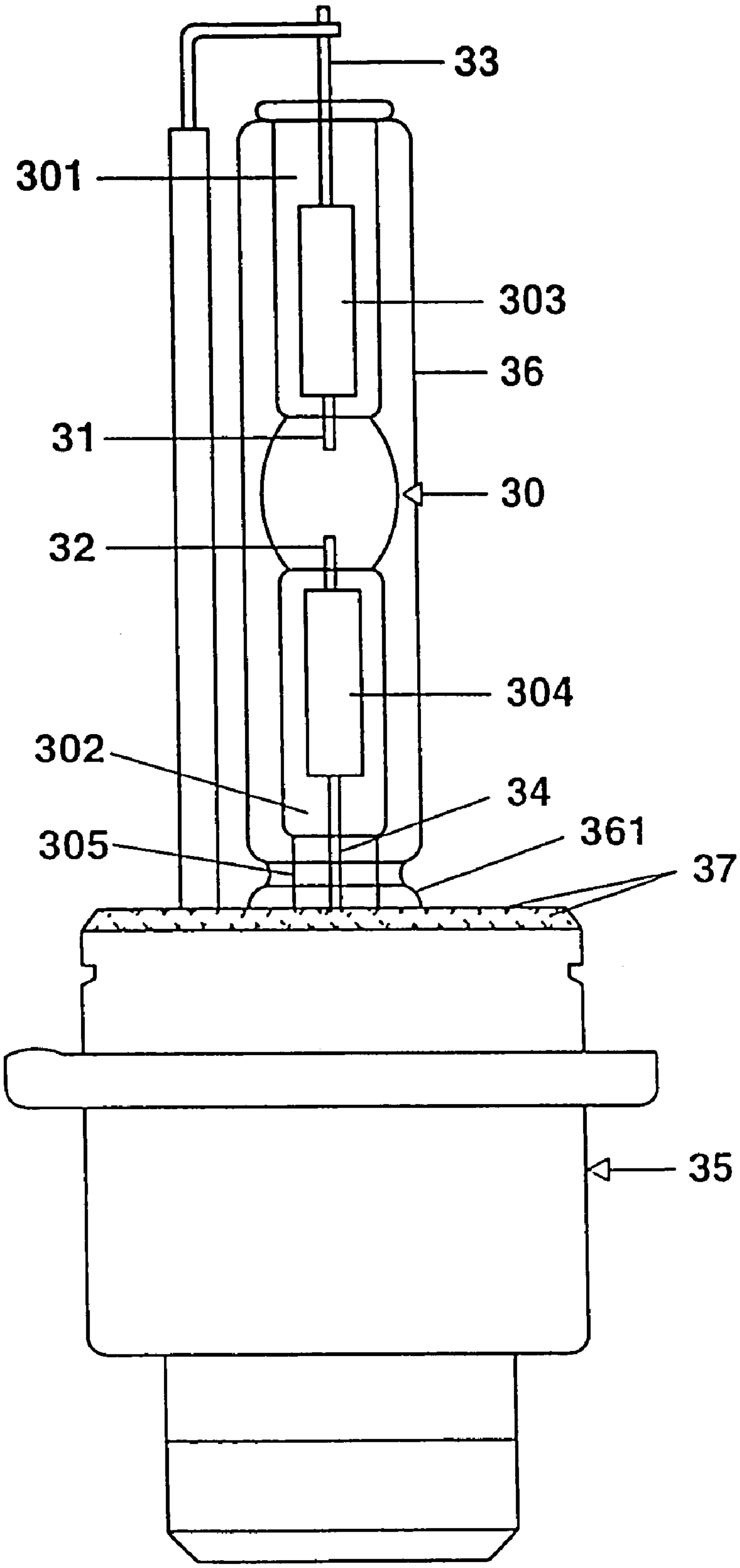

The invention is explained in more detail below on the basis of several preferred exemplary embodiments. In the drawing:

FIG. 1 shows a side view of a lamp according to the first exemplary embodiment of the invention, FIG. 2 shows a plan view of the surface facing the lamp vessel of the base of the lamp depicted in FIG. 1, FIG. 3 shows a side view of a lamp according to the second exemplary embodiment of the invention.

V. BEST MODE FOR CARRYING OUT THE INVENTION

The first exemplary embodiment of the invention is a single-filament halogen lamp which is intended for use in a motor-vehicle headlight. This lamp has a glass lamp bulb 10 that is substantially cylindrical and has a gastight-sealed pinch foot 10*a*. The dome 10*b* of the lamp bulb 10 is provided with a light-absorbing coating. Serving as a light source is an incandescent filament 11, which is aligned parallel to the axis of the lamp bulb and is connected in an electrically conducting manner to two current supply leads 12, 13 that are led out from the pinch foot 10*a* and consist of molybdenum wire. The pinch foot 10*a* of the lamp bulb 10 is fixed in a metal holder, which comprises the cup-like holder part 14*a*, the intermediate ring 14*e* and the annular carrier sleeve 14*b*. Apart from the metal holder 14*a*, 14*b*, the lamp base also has a plastic base part 15, which is provided with the electrical terminals 16, 17 of the lamp and in which the annular metal carrier sleeve 14*b* is anchored. The carrier sleeve 14*b* has three reference lugs 14*c*, lying in one plane, and a pressure-exerting spring 14*d* for mounting the lamp in the reflector 20 of a motor-vehicle headlight. The sealing of the reflector 20 is performed by means of a silicone sealing ring 19, which bears against the outer wall of the reflector 20 and against the annular flange 15*a* of the plastic base part 15. The construction of the lamp according to the first exemplary embodiment and its use in a headlight are schematically represented in FIG. 1. The upper side of the annular flange 15*a*, facing the lamp bulb 10, is provided with a 1 μm thick layer 21 of a copper-oxygen compound (FIG. 2). This layer was applied before the mounting of the lamp base to the plastic base part 15 by means of a reactive PVD sputtering process. This process is described for example in the laid-open patent application DE 100 45 544 A1.

The second exemplary embodiment is a metal-halide high-pressure discharge lamp, which has a discharge vessel 30 made of quartz glass which is sealed on two sides and in which an ionizable filling is enclosed in a gastight manner. The ionizable filling contains xenon and metal halide compounds. This lamp is intended for use in a vehicle headlight. The two ends 301, 302 of the discharge vessel 30 are respectively sealed by means of a molybdenum foil seal 303, 304. Located in the interior of the discharge vessel 30 are two electrodes 31, 32, between which the discharge arc responsible for the emission of light is formed during operation of the lamp. The electrodes 31, 32 are respectively connected in an electrically conducting manner to an electrical terminal of the lamp base 35, substantially consisting of plastic, for example polyphenylene sulfide, via one of the molybdenum foil seals 303, 304 and via the current supply lead 33 that is remote from the base or via the current return 34 that is on the base side. The discharge vessel 1 is enclosed by a glass outer bulb 36. The outer bulb 36 has a continuation 361 anchored in the base 35. The discharge vessel 30 has on the base side a tubular elongation 305 of quartz glass, in which the current supply lead 34 on the base side runs. The surface of the plastic base 35 facing the lamp vessels 30, 35 is provided with an approximately 1 μm thick coating 37, which consists of a copper-oxygen compound. This layer 37 was applied to the surface by means of a reactive PVD sputtering process before the mounting of the lamp vessels 30, 35 in the lamp base 35.

In the case of the two lamps described above, coatings which consist of an aluminum-nitrogen compound and have a layer thickness of approximately 1 μm can be used instead of the copper-oxygen compound for the coatings 21 and 37. This compound is also generated by means of the above-mentioned reactive PVD sputtering process.

The invention is not restricted to the exemplary embodiments explained in more detail above. For example, it is also possible for all the surfaces of the plastic base or plastic base part to be provided with the coating according to the invention.

Furthermore, the luminous means may also be a light-emitting diode or a laser diode instead of an incandescent filament or a gas discharge arc.

What is claimed is:

1. A lamp with at least one luminous means and a plastic part, the surface of which is at least partially provided with a radiation protective coating formed from a compound of a metal and oxygen and/or nitrogen having a coating thickness of approximately one micron.

2. The lamp as claimed in claim 1, wherein said metal is from the group of metals iron, copper, zirconium and aluminum.

* * * * *